United States Patent [19]
Tibi

[11] Patent Number: 5,633,864
[45] Date of Patent: May 27, 1997

[54] COMMUNICATION SYSTEM COMPRISING AN ATM NETWORK AND A DEMULTIPLEXING DEVICE

[75] Inventor: George Tibi, Fontenay aux Roses, France

[73] Assignee: U.S. Philips Corporation, New York, N.Y.

[21] Appl. No.: 647,254

[22] Filed: May 13, 1996

Related U.S. Application Data

[63] Continuation of Ser. No. 268,703, Jun. 29, 1994, abandoned.

[30] Foreign Application Priority Data

Jun. 30, 1993 [FR] France .................. 93 08001

[51] Int. Cl.⁶ .................................................. H04L 12/64
[52] U.S. Cl. .................................. 370/392; 370/396
[58] Field of Search ........................... 370/58.1, 58.2, 370/58.3, 60, 60.1, 85.1, 85.9, 85.11, 94.1, 94.2, 112, 67

[56] References Cited

U.S. PATENT DOCUMENTS

| | | | |
|---|---|---|---|
| 4,815,074 | 3/1989 | Jacobsen | 370/112 |
| 4,862,451 | 8/1989 | Closs et al. | 370/60 |
| 5,317,562 | 5/1994 | Nardin et al. | 370/16 |
| 5,381,410 | 1/1995 | Grenot | 370/60.1 |

FOREIGN PATENT DOCUMENTS

| | | | |
|---|---|---|---|
| 0351818 | 1/1990 | European Pat. Off. | H04L 12/56 |
| 2670972 | 6/1992 | France | H04L 12/00 |
| 8911764 | 11/1989 | WIPO | H04L 11/20 |

*Primary Examiner*—Benedict V. Safourek
*Assistant Examiner*—Russell W. Blum
*Attorney, Agent, or Firm*—Arthur G. Schaier

[57] ABSTRACT

A communication system comprising an Asynchronous Transmission Mode ("ATM") network and at least one demultiplexing device. The demultiplexing device receives information cells which include a header, containing the destination to which the cells are to be transmitted, and data. The demultiplexing device comprises at least one input access for receiving the cells, a plurality of output accesses, at least one network circuit, a plurality of service circuits and a common data line. The network circuit has an input access, a header analyzing element, a routing table and a combining element. At least one of the output accesses are assigned to each of the service circuits. The routing table produces a routing information signal which determines the destination to which the cells are to be transmitted. The combining element combines the information signal and the data and transmits the same on the common data line.

14 Claims, 5 Drawing Sheets

COMMUNICATION SYSTEM COMPRISING AN ATM NETWORK AND A DEMULTIPLEXING DEVICE

This is a continuation of application Ser. No. 08/268,703, filed Jun. 29, 1994, now abandoned.

BACKGROUND OF THE INVENTION

1. Field of the Invention

The invention relates to a communication system comprising an ATM network and a demultiplexing device, which device transmits from one of its access points to another access point, information cells formed by a header portion containing an indication of the destination and by a data portion formed by transmit payload, which device comprises:

at least an input access for receiving said cells, a plurality of output accesses for users, at least a network circuit which has an input access and comprises a header analyzing element, a plurality of service circuits to each of which is assigned at least an output access, and a common line.

The present invention likewise relates to a demultiplexing device, more specifically, for a network of the ATM type.

2. Discussion of the Related Art

ATM networks are used more and more and permit the transmission of large information streams at variable rates to satisfy the different requirements such as made by telephone links and video links. The information streams are transmitted in the form of cells and the demultiplexing devices are to switch each cell they receive on their input access to the correct output access. This task becomes ever more difficult as the number of received cells becomes ever higher.

A demultiplexing device to be used in a communication system of this type which is capable of performing demultiplexing operations is known from French Patent Application Nr. 2,670,972.

This known device is formed by input junction units whose functions may be compared with said network circuits and whose output junction units may be compared with the service circuits.

All the junction units, both output and input junction units, are to have identical characteristic features, because mixing operations are to be carried out for which any input cell of whatever input junction unit can go to the output of whatever output junction unit.

It occurs that users wishing to make use of the services of ATM networks do not need mixer-type devices because these devices often have few input access points for the network compared to the number of output accesses.

A drawback of the known device resides in the fact that the transmit cells are stored twice: a first storage is effected in the input junction unit during the period of time in which the output junction is waited for to be ready to receive the cell destined thereto, and the second storage in the output junction unit during the period of time in which the user device is about to tap the cells. This double storage, in addition to the fact that it implies more equipment, brings along transmission delays which may be annoying to certain applications, for example, the transmission of moving pictures which pictures may not be too jerky on recovery.

SUMMARY OF THE INVENTION

The present invention proposes a communication system of the type defined in the opening paragraph in which the demultiplexing device does not need to store the cells twice (i.e., the cells are stored only once by the service elements of the service circuits of the demultiplexing device).

Therefore, such a system is characterized in that each network circuit comprises a header analysing element and a routing Table for producing on, upon receipt of a cell by the header analyzing element, a common data line, a routing information signal which defines at least the service circuit that forms the destination of the cell, and a combining element for transmitting over the data line both the routing information signals and said cells.

BRIEF DESCRIPTION OF THE DRAWINGS

The following description accompanied by the annexed drawings, all given by way of non-limiting example, will make it better understood how the invention may be realized, in which.

DETAILED DESCRIPTION OF THE PREFERRED EMBODIMENT

Figure 1:
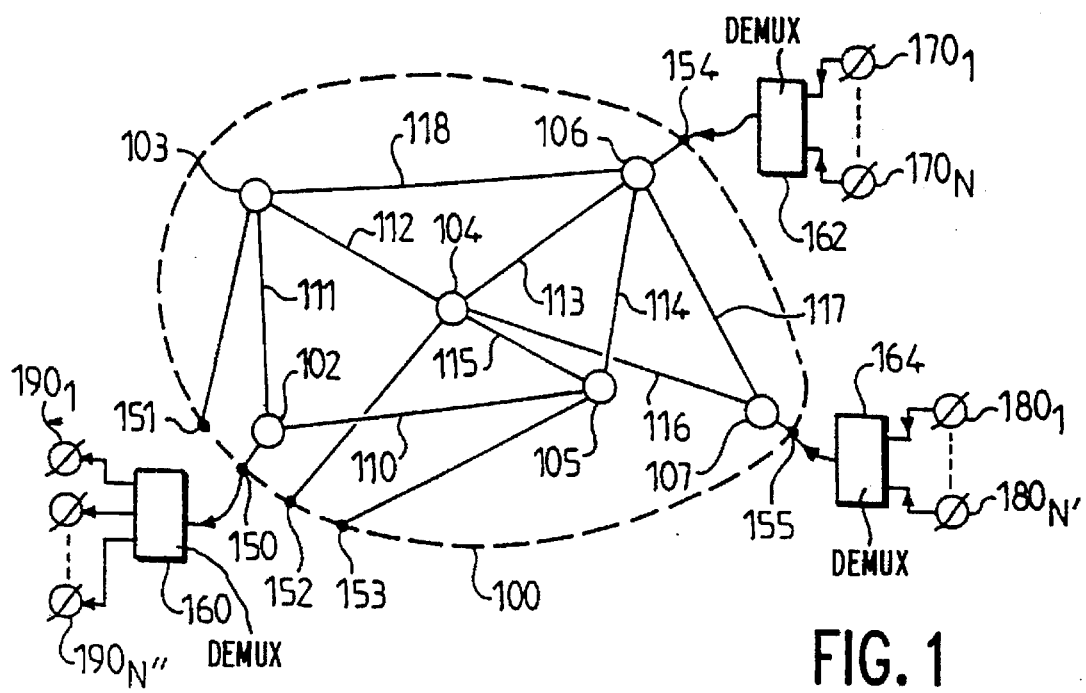
FIG. 1 shows a network to which demultiplexing devices according to the invention can be connected.

FIG. 1 shows diagrammatically an ATM network referenced 100 in the Figure. A description of this network will be found in the book entitled "ASYNCHRONOUS TRANSFER MODE" by MARTIN de PRYCKER, published by ELLIS HORWOOD LIMITED, England. This type of network is particularly suitable for various transmission services such as video conferencing, telephone links, extensions to local networks, and so on.

This network is formed by various nodes 102, 103, 104, 105 and 106 interconnected by links 110 to 118 to connect the nodes 102-105, 102-103, 103-104, 104-106, 105-106, 104-105, 104-107, 106-107, 103-106, respectively. At the respective nodes 102, 103, 104, 105, 106 and 107, access points of this network which may be situated at different geographical locations are referenced 150, 151,152, 153, 154 and 155, respectively. To these points are connected various types of equipment performing multiplexing and demultiplexing operations at the same geographical location. To simplify the explanation, only multiplexing and demultiplexing devices will be mentioned hereinafter, without an indication as to the equipment in fact containing the two devices. To the points 150, 154 and 155 are connected various multiplexing and demultiplexing devices 160, 162 and 164, respectively. From these devices there are to be distinguished: a demultiplexing device 160, the object of the present invention, and two multiplexing devices 162 an 164 which perform the reverse operations to those of the device 160. Thus, within the framework of the example described, the information signals can go from the devices 162 and 164 to the device 160 by passing through network 100. These signals to be transmitted are applied to a plurality of access terminals $170_1$ to $170_N$, on the one hand, and $180_1$ to $180_{N'}$, on the other hand, which the respective multiplexing devices 162 and 164 have, and can be produced, among other things, on output terminals $190_1$ to $190_{N''}$ of the device 160.

Figure 2:
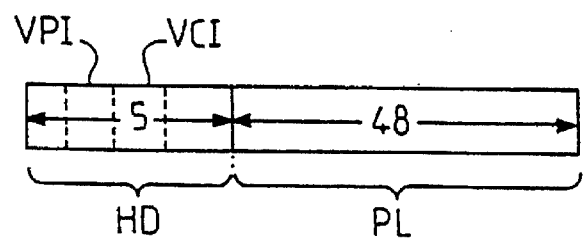
FIG. 2 shows the structure of an information cell.

The information signals transmitted in the network are represented in the form of cells whose structure is shown in FIG. 2. These cells are formed by 53 octets: 5 form the header HD and the remaining 48 octets PL contain the data for a transmission service accompanied, as required, by additional information signals to recover the data of this service on reception. In the header are distinguished two fields VPI and VCI which are formed, respectively, by 8 and 16 binary cells and which indicate the destination address of the cell. Field VPI may be considered the address of the equipment comprising the destination demultiplexer, a VP, a virtual path linking the two types of transmission and destination equipment between which cells are transported. The field VCI may be considered the address of the service performed by the destination equipment, a VC, a virtual channel linking the two pieces of equipment.

Figure 3:
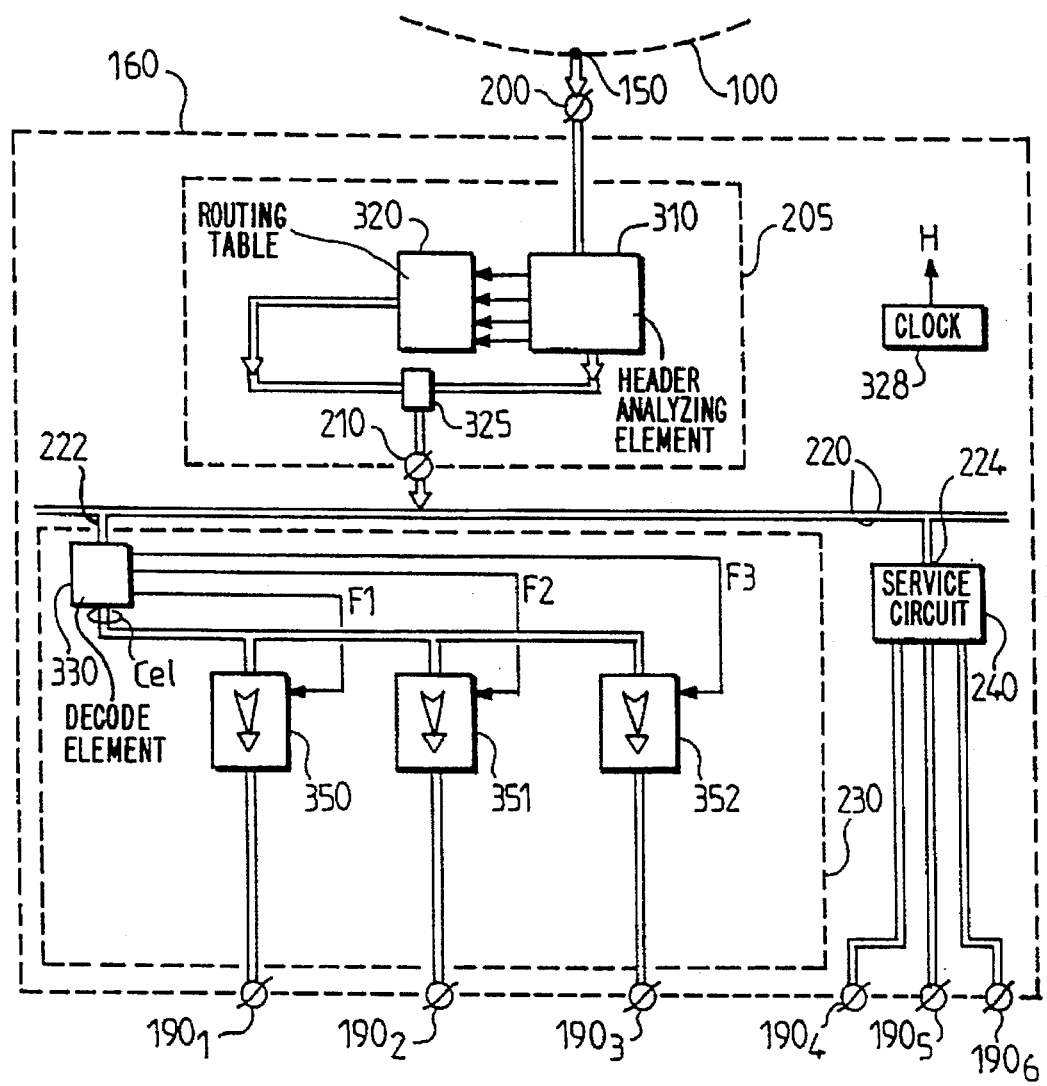
FIG. 3 shows a first device according to the invention.

Device 160 shown in FIG. 3 comprises an access 200 connected to point 150 of the ATM network 100. At this access arrives an information cell stream having accesses $190_1$ to $190_{N''}$ for their destination, which accesses are assigned, in principle, to services which may be different; in fact only six accesses $190_1$ to $190_6$ are shown in the drawing Figure. The device shown in FIG. 3 is formed by a network circuit 205 having an access 200. This network circuit has an output 210 which is connected to a common data line 220. Various inputs 222 and 224 of service circuits 230 and 240 are combined with this line 220. The output accesses $190_1$ to $190_3$ are dedicated to the circuit 230 and the accesses $190_4$ to $190_6$ to the circuit 240.

According to the invention the network circuit 205 comprises a header analyzing element 310 cooperating directly with the routing Table 320 upon a receipt of a cell to produce on the common data line 220 a routing information signal which defines, among other things, the service circuit (230 or 240 in the case of the example shown in FIG. 3) and a combining element 325 to transmit over the common line both the muting information signals and said cells.

It is appropriate to analyze the fields VPI and VCI of the header of each cell. As these fields are formed by 24 binary cells, the use of a decoding Table which would have $2^{24}$ (16777216) inputs is avoided. The routing Table 320 is preferably realized according to the methods outlined by the article: "Putting Routing Tables in Silicon" by Tong-Bi Pei and Charles Zukowski, published in IEEE Network Magazine of January 1992, pages 42 to 50. This Table thus determines as a function of the VPI and VCI the service circuit concerned and transmits over the line 220 an identification code of the service card as well as a service code assigned to this service card. These identification and service codes form the routing information.

Figure 5:
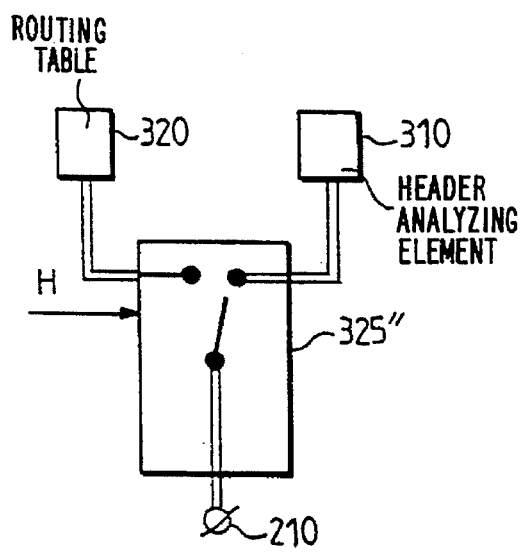
FIG. 5 shows a second variant of a combining element which may be suitable for the device shown in FIG. 3.

The routing information of the cells can be transmitted over the common line 220 in at least two ways:

a first way consists of transmitting these information signals and the cells in parallel over two flat cables formed by wires 220A and 220D, respectively. A combining element 325', as is represented in FIG. 4, is used for this purpose, which Figure shows this wire juxtaposition.

another way consists of transmitting them successively over the same wires of this line in timing with the signals H of a clock 328. FIG. 5 shows a combining element 325" for this purpose, which element connects line 220 to the output of the routing Table 320 and, subsequently, to the output of the header analyzing element 310 in turns.

As regards the service circuits, they comprise a decoding element 330 for decoding the routing information and for switching the cells to service elements 350, 351 and 352 which form part of the service circuit 230 and which service elements are connected each to one of the output accesses $190_1$ to $190_3$. These decoding elements have an input which is merged with input 222 if element 330 is considered, connected to the common data line 220, and have outputs for wires F1, F2 and F3 for activating one of the service elements 350, 351 and 352 by the appropriate code present on line 220. These service elements store the cell made available on output "Cel" of the decoder 330. The service elements are constituted by read/write memories arranged as queue memories of the first-in first-out type (FIFO memory). Thus the cells are written at the rate at which they arrive at the service element and are tapped at the rate determined by the user.

Figure 4:
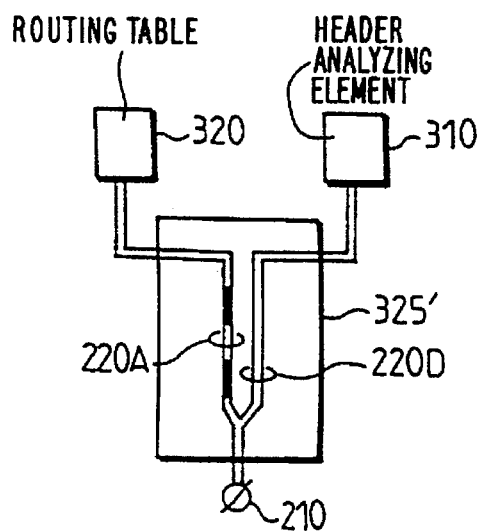
FIG. 4 shows a first variant of an embodiment for a combining element which may be suitable for the device shown in FIG. 3.
Figure 6:
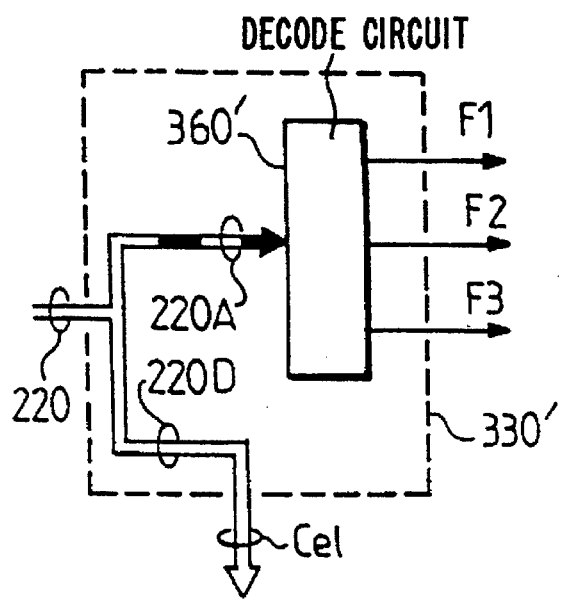
FIG. 6 shows a first variant of an embodiment for a decoding element which can cooperate with the element shown in FIG. 4.

FIG. 6 shows a decoding element 330' which cooperates with the combining element of FIG. 4. It is formed by a decoding circuit 360 and produces an activating signal on one of the wires F1, F2 or F3 the moment a code relating to one of the service elements is concerned. This activating signal makes it possible for the service element concerned to store the cell present on the output "Cel" which is tapped directly from 220D.

Figure 7:
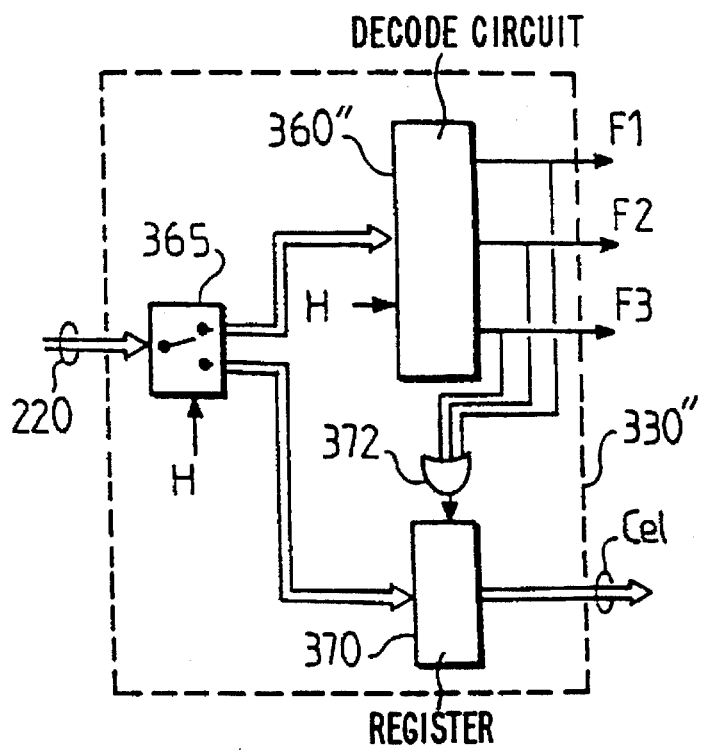
FIG. 7 shows a second variant of a decoding element which can cooperate with the element shown in FIG. 5.

Decoding element 330" which cooperates with the element of FIG. 5 is shown in FIG. 7. It is formed by a decoding circuit 360" which does not differ from the circuit 360' but for the fact that it has a refresh storage function in timing with the signals H. This circuit 360" is fed by the codes of line 220 via a two-position switch 365 when the latter has adopted its first position. The change of position is controlled at the rate of the signals H. This switch also permits applying the codes of line 220 to the inputs of the register 370 when the switch has adopted its second position. An OR gate 372, whose inputs are connected to wires F1, F2 and F3 of the decoding circuit 360" authorizes the loading of this register when one of the signals transmitted over one of the wires F1, F2 or F3 is active.

Figure 8:
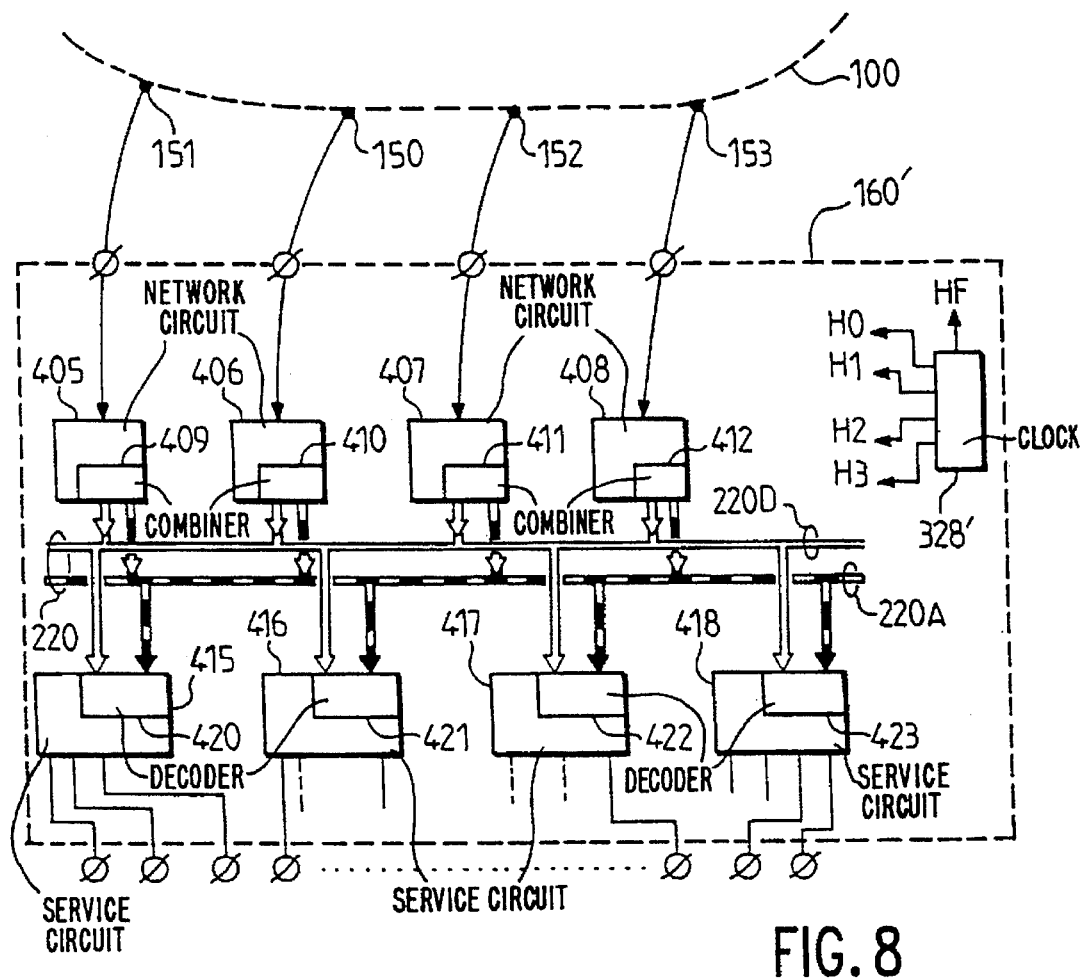
FIG. 8 shows a second device according to the invention.

FIG. 8 shows a preferred embodiment of the invention. In this embodiment the device 160' is formed by a plurality of network circuits. In this example illustrated in this Figure four of these network circuits are shown: circuits 405, 406, 407 and 408 whose inputs are connected to the respective network access points 151, 150, 152 and 153 and whose outputs are connected to the common line 220 via combining elements 409, 410, 411 and 412. This line 220 is formed, in a manner already known, by flat cables of wires 220A and 220D which transmit the routing information and the cells, respectively. The device 160' also comprises a plurality of service circuits 415, 416, 417 and 418. The inputs of the decoders 420, 421, 422 and 423 of the service circuits 415, 416, 417 and 418 respectively, are connected to these two flat cable wires 220A and 220D of this line 220. The structure of the network circuits 405 to 408 and that of the service circuits 415 to 418 do not differ from those of the service circuits 230 and the network circuit 205 already described but for their combining elements and their decoders.

Figure 9:
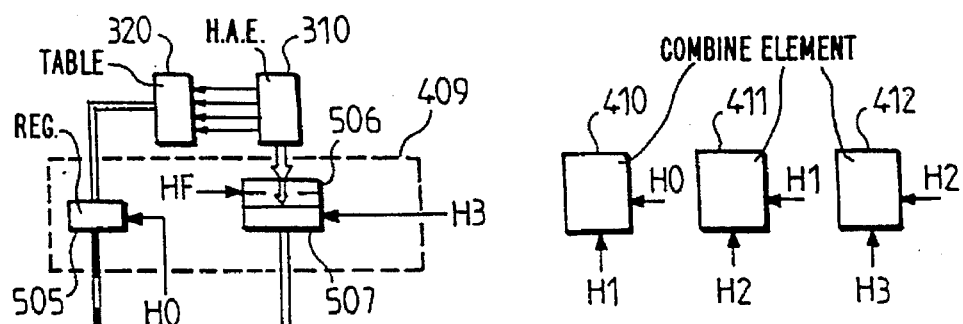
FIG. 9 shows the embodiment for combining elements which form part of the device shown in FIG. 8.
Figure 10:
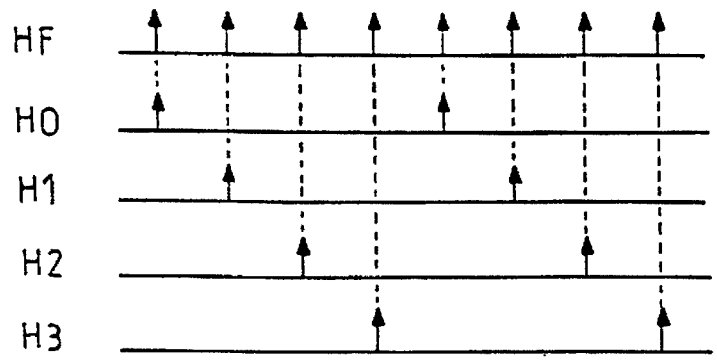
FIG. 10 shows the shape of clock-signals present in the device shown in FIG. 8.

FIG. 9 shows the combining elements of network circuits 405 to 408 in detail. These elements are identical but for the clock-control signals H0, H1, H2 and H3 produced by a clock-circuit 328'. The shape of these signals is shown in FIG. 10. These signals are derived, by a division by 4, from a clock signal HF also produced by the clock 328' and are mutually phase shifted by a period of the signal HF. They permit assigning of access times to the line for the network circuits. The period of these signals H0 to H3 is equal to the shortest time separating two cells coming from network 100. Thus, there is ensured that the traffic will be handled by the network cards. The combining element 409 produces at the instant at which H0 is active the routing information on line 220A and the cell on line 220D after a period of time equal to two periods of the signal HF.

Figure 11:
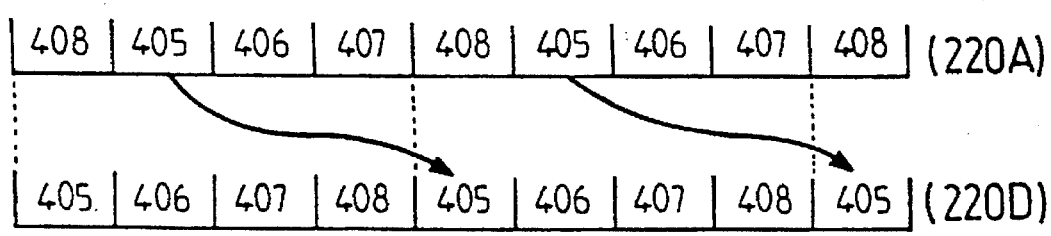
FIG. 11 shows a time-diagram to facilitate the explanation of this second device according to the invention.

For this purpose, the element 409 (see FIG. 9) is formed by a first register 505 which is connected to the output of the Table 320 and whose contents are unloaded onto line 220A each time the signal H0 is active. A double register 506 controlled by the signals HF shifts the cell at the output of the header analyzing element by two periods of this signal. It is the signal H3 that makes it possible for the cell of the network circuit 405 to possess line 220D by influencing an output circuit 507. FIG. 11 shows the pipe-line function of the lines 220A and 220D, the reference characters in the boxes indicate the references of the network circuits using these lines.

Figure 12:
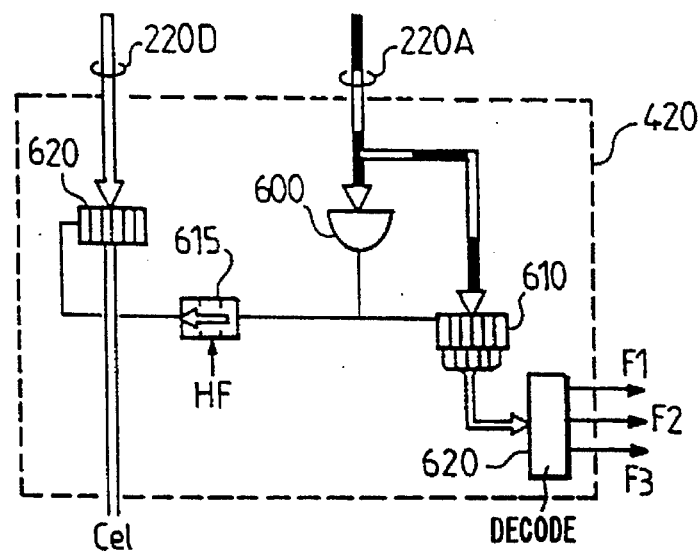
FIG. 12 shows the embodiment for decoding circuits which form part of the device shown in FIG. 8.

FIG. 12 shows the decoding element 420 in detail. The directly resulting structures of the other decoding elements dedicated to the service circuits 506 to 508 may differ only by the number of activating wires F1, F2, . . .

The circuit 420 is formed by a decoding circuit 600 which produces an activating signal once a code relating to the service circuit including this decoding circuit occurs on line 220A. This activating signal, on the one hand, permits writing the code present on line 220A in register 610 and, on the other hand, is stored in a delay circuit 615 controlled by the signals HF of the clock 328' to produce a delay equal to two periods of signal HF. The activating signal thus delayed permits the storage of the cell transmitted by line 220D. The cell thus stored is sent to the service element enabled by one of the wires F1, F2 or F3 present on the output of a decoding circuit 620 connected to the outputs of register 610.

What is claimed is:

1. A communication system comprising an Asynchronous Transmission Mode ("ATM") network operatively connected to at least one demultiplexing device, said at least one demultiplexing device for transmitting, from a first access point of a plurality of access points to a plurality of second access points of said plurality of access points, information cells, said cells including a header portion comprising an identification of a destination service circuit to which said cells are to be transmitted and a data portion comprising a transmit payload, said at least one demultiplexing device comprising:

at least one input access operatively connected to said ATM network for receiving said cells;

a plurality of output accesses operatively connected to said second access points;

at least one network circuit, operatively connected to said at least one input access, comprising a header analyzing element;

a common data line operatively connected to said network circuit; and a plurality of service circuits each operatively connected to said common data line and at least one of said plurality of output accesses, wherein each said network circuit further comprises a routing table, operatively connected directly to said header analyzing element for producing a routing information signal upon a receipt of each information cell, the routing information signal including at least the identification of said destination service circuit that comprises the destination of the respective cell, and said network circuit further comprising a combining element for transmitting, over the common data line, both the routing information signal and said cells, wherein each of said plurality of service circuits comprises a decoding element and a plurality of service elements, said decoding element for decoding the routing information signal and transmitting the respective cell to a service element of said plurality of service elements based on the routing information signal, wherein the respective cell is stored only once by said demultiplexing device in the service element.

2. Communication system as claimed in claim 1, wherein the common data line comprises a first flat cable for the transmission of said routing information signal and a second flat cable for the transmission of said cells.

3. Communication system as claimed in claim 1, wherein said demultiplexing device further comprises a plurality of said network circuits, and means for controlling access to the common data line so that each of the network circuits is connected to said common data line at distinct time intervals.

4. Communication system as claimed in claim 3, wherein said demultiplexing device further comprises a plurality of said network circuits, and means for controlling access to the common data line so that each of the network circuits is connected to said common data line at distinct time intervals.

5. A communication system as in claim 1, wherein said combining element comprises:

a first input connected to said header analyzing element;

a second input connected to said routing table;

a first wire connected to said first input;

a second wire connected to said second input;

an output operatively connected to said plurality of service circuits; and a third wire connected to said first and second wire and connected to said output.

6. A communication system as in claim 1, wherein said combining element comprises:

a first input connected to said header analyzing element;

a second input connected to said routing table;

a first wire connected to said first input;

a second wire connected to said second input;

an output operatively connected to said plurality of service circuits;

a third wire alternately connected to said first and second wires and connected to said output; and means for alternating said connection between said third wire and said first and said second wires.

7. The communication system as in claim 1, wherein each of said plurality of service circuits further comprise means for directing a respective cell, based on said routing information signal, to an output access of said plurality of output access.

8. The communication system as in claim 7, wherein said means for directing a respective cell includes a plurality of service elements connected to said decoding element, wherein said decoding element activates a service element of said plurality of service elements based upon the routing information signal to allow an activated service element to receive a respective cell.

9. A communication system as in claim 8, wherein said plurality of service elements comprise first-in first-out read/write memory units.

10. A communication system as in claim 8, wherein said decoding element comprises:
- a decoder input operatively connected to said combining element;
- a decoding circuit connected to said decoder input and operatively connected to said plurality of service elements for activating said plurality of service elements; and
- a decoding output operatively connected to said plurality of service elements for outputting said cells.

11. A communication system comprising an Asynchronous Transmission Mode ("ATM") network operatively connected to at least one demultiplexing device, said at least one demultiplexing device for transmitting, from a first access point of a plurality of access points to a plurality of second access points of said plurality of access points, cells, said cells including a header portion comprising an identification of a destination service circuit to which said cells are to be transmitted and a data portion, said at least one demultiplexing device comprising:
- a plurality of input accesses operatively connected to said ATM network for receiving said cells;
- a plurality of output accesses operatively connected to said plurality of second access points;
- a plurality of network circuits, operatively connected to respective ones of said plurality of input accesses, each comprising a header analyzing element;
- a common data line operatively connected to said plurality of network circuits; and
- a plurality of service circuits each operatively connected to said common data line and at least one of said plurality of output accesses,
  - wherein each of said plurality of network circuits further comprises a routing table, operatively connected directly to said header analyzing element for producing a routing information signal upon a receipt of a cell by said header analyzing element, wherein each routing information signal includes the identification of said destination service circuit, and
  - each of said plurality of network circuits further comprising a combining element for transmitting, over the common data line, both the routing information signal and a respective cell, and
  - means for controlling access to the common data line so that each of the plurality of network circuits is connected to said common data link at distinct time intervals, wherein a respective cell is stored only once by said demultiplexing device at the destination service circuit.

12. A demultiplexing device comprising:
- at least one network circuit;
- at least one input operatively connected to said at least one network circuit for receiving a cell, the cell including a header portion having an identification of a destination service circuit to which the cell is to be transmitted and a data payload portion;
- a plurality of service circuits operatively connected to said at least one network circuit;
- a plurality of outputs operatively connected to said plurality of service circuits,
- said at least one network circuit including:
  - a header analyzing element operatively connected to said at least one input;
  - a routing table operatively connected directly to said header analyzing element for producing a routine information signal upon a receipt of a cell by said header analyzing element, the routing information signal including at least the identification of a destination service circuit corresponding to a destination of the respective cell; and
  - means, operatively connected to said header analyzing element and said routing table, for combining an output of said header analyzing element combined with an output of said routing table to create a combined output,
  - said means for combining being operatively connected to said plurality of service circuits and outputting said combined output to said plurality of service circuits,
  - said routing table outputting the routing information signal for directing said combined output to the destination service circuit of said plurality of service circuits based on the routine information signal, wherein a respective cell is stored only once by said demultiplexing device at the destination service circuit.

13. A demultiplexing device as in claim 12, wherein said means for combining comprises:
- a first input connected to said header analyzing element;
- a second input connected to said routing table;
- a first wire connected to said first input;
- a second wire connected to said second input;
- an output operatively connected to said plurality of service circuits; and
- a third wire connected to said first and second wire and connected to said output.

14. A demultiplexing device as in claim 12, wherein said means for combining comprises:
- a first input connected to said header analyzing element;
- a second input connected to said routing table;
- a first wire connected to said first input;
- a second wire connected to said second input;
- an output operatively connected to said plurality of service circuits;
- a third wire alternately connected to said first and second wire and connected to said output; and
- means for alternating said connection between said third wire and said first and said second wires.

* * * * *